H. B. HARTMAN.
FLOW RESPONSIVE CIRCUIT CONTROLLER.
APPLICATION FILED AUG. 11, 1911.
1,065,362.
Patented June 24, 1913.
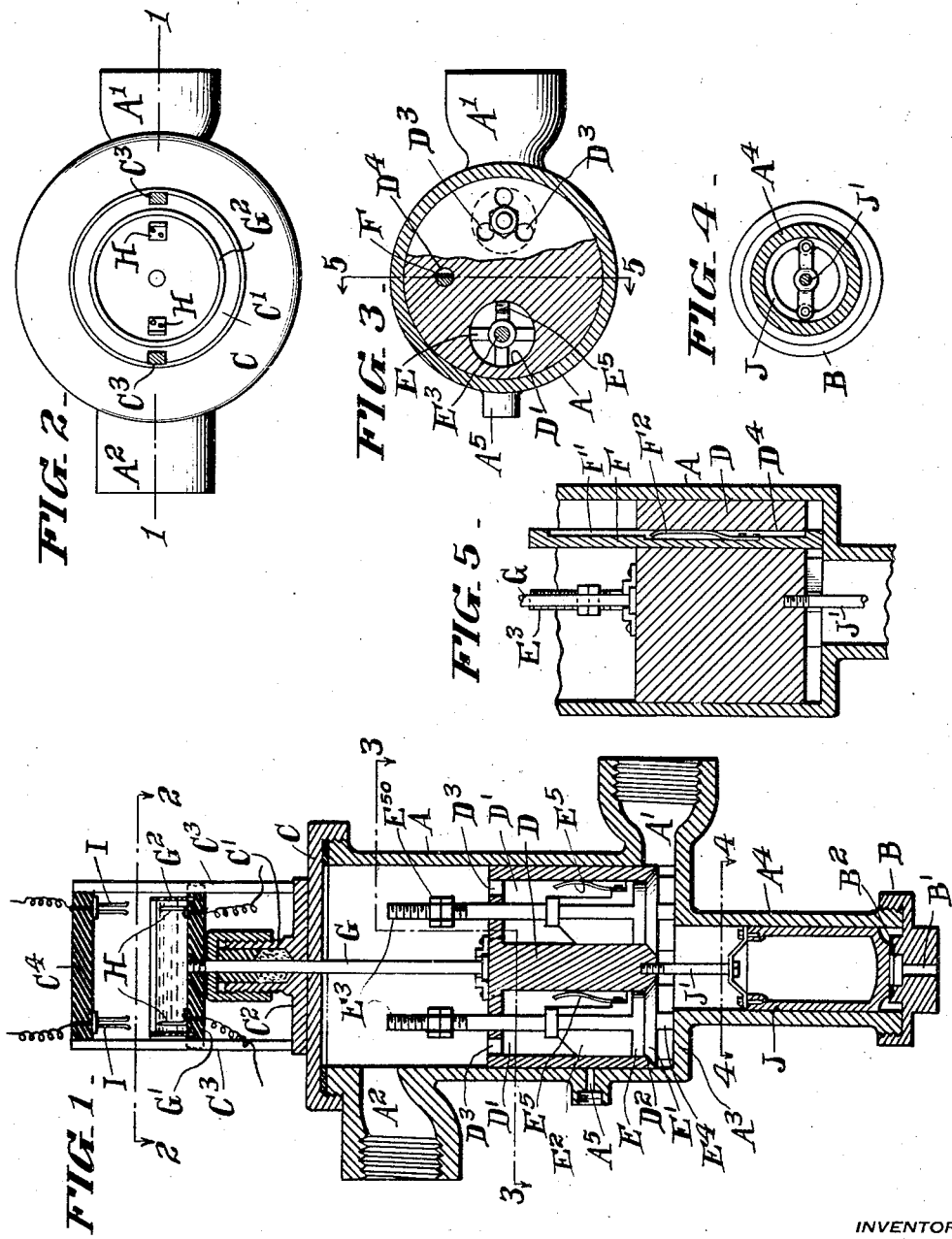
WITNESSES
INVENTOR
Harry B. Hartman
BY
ATTORNEY

UNITED STATES PATENT OFFICE.

HARRY B. HARTMAN, OF PHILADELPHIA, PENNSYLVANIA, ASSIGNOR OF ONE-HALF TO HIMSELF AND ONE-HALF TO GEORGE A. DUNNING, OF PHILADELPHIA, PENNSYLVANIA.

FLOW-RESPONSIVE CIRCUIT-CONTROLLER.

1,065,362.  Specification of Letters Patent.  Patented June 24, 1913.

Application filed August 11, 1911. Serial No. 643,475.

*To all whom it may concern:*

Be it known that I, HARRY B. HARTMAN, a citizen of the United States of America, residing in the city and county of Philadelphia and State of Pennsylvania, have invented a certain new and useful Improvement in Flow-Responsive Circuit-Controllers, of which the following is a true and exact description, reference being had to the accompanying drawings, which form a part thereof.

My present invention consists in an improved device for making and breaking electric circuit connections in response to the variations in the flow of a fluid through a conduit or receptacle.

The invention is particularly adapted for use in apparatus for the electrical purification of water to make and break the circuit supplying electric current to the electrodes for electrolyzing the water to be purified as the latter begins and ceases to flow through the apparatus. In my copending application, Serial No. 643,743, filed of even date herewith, I have illustrated and described a water purification plant embodying the circuit controlling means disclosed herein.

The main object of the invention is to provide a simple, compact, durable and reliable device for the purpose specified.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Of the drawings, Figure 1 is a sectional elevation, the section being taken on the line 1—1 of Fig. 2. Fig. 2 is a sectional plan, the section being taken on the line 2—2 of Fig. 1. Fig. 3 is a section taken on the broken line 3—3 of Fig. 1. Fig. 4 is a section taken on the line 4—4 of Fig. 1, and Fig. 5 is a partial sectional elevation taken on the line 5—5 of Fig. 3.

In the drawings, A, represents a cylinder formed with an inlet $A'$ at its lower end and an outlet $A^2$ at its upper end. In the use of the apparatus the cylinder A is adapted to be connected in and form a part of a conduit through which passes the fluid to the flow of which the device is responsive. The fluid enters through the inlet $A'$ at the lower end of the cylinder and passes away from the cylinder at its upper end through its outlet $A^2$. The lower end head of the cylinder A is integral with the body of the cylinder and is formed with a centrally disposed cylindrical extension $A^4$ of reduced cross section. The lower end of the extension $A^4$ is closed by a removable cap or head B. The upper end of the cylinder proper is closed by the cylinder head C.

Working in the cylinder A is a piston like member D. The piston D is formed with one or more, two as shown, passages $D'$ which extend up into the piston from its lower end and open at the upper end of the piston, each through a plurality of small ports $D^3$. Each set of ports $D^3$ may be regarded as an extension of the corresponding passage $D'$ since the only purpose of employing these passages $D^3$ in lieu of extending the passages $D'$ directly through the piston is to provide bearings at the upper end of the piston for the stems $E^3$ of the valve members E located one in each passage $D'$. Each valve member E comprises a short cylindrical body portion adapted to enter the lower end of the corresponding passage $D'$ when the valve is closed as shown in Fig. 1. Beneath the cylindrical body portion each valve E is formed with a conical portion $E'$ adapted to directly engage and seat upon the conical valve seat $D^2$ formed at the lower end of each passage $D'$. Each valve member E is formed at its lower side with ribs or lugs $E^4$ which are adapted to seat on the lower cylinder head $A^3$ as the piston D moved down into the position shown in Fig. 1, to thereby arrest the downward movements of the valves E and of the piston D. These lugs hold the body of the piston D away from the head $A^3$ thereby exposing the lower ends of the valves E and piston D to the action of the fluid admitted to the cylinder through the passage $A'$. Each valve E is also provided with guide ribs $E^2$ which are connected at their upper ends to the corresponding valve stem $E^3$. A spring $E^5$ connected to one of the ribs $E^2$ cut away for the purpose, engages the wall of the chamber $D'$ and serves as a frictional device tending to hold each valve E in any position with regard to the piston D into which it may be moved. A cup-shaped piston J connected to the piston D by the stem J' and working in the cylinder extension A⁴, forms a means for moving the piston D into and maintaining it in the position shown in Fig. 1 when the pressures at the opposite ends of the piston D are substantially equal as is the case when the conduit connection to the outlet port A² is closed. A vent passage B' formed in the head B permits the escape of any water leaking by the piston J when the piston J is elevated. When the apparatus is in the condition shown in Fig. 1 the lower end of the piston J seats upon the valve seat B² provided on the end member B and closes the passage B'.

With the apparatus in the condition shown in Fig. 1 when the pressure at the upper end of the cylinder A is reduced as by opening a faucet or valve in the conduit connected to the outlet port A², the excess of pressure then acting on the piston D in the upward direction causes the piston to move upward. The valves E share the initial upward movement of the piston D until the valve stems E³ engage the upper cylinder head C. This does not check the upward movement of the piston D, however, which continues until the passages D' and D² are opened to permit a substantial free flow through the piston D. It will be understood, however, that in order to establish an equilibrium there must be a sufficient throttling action to create a difference in pressure at the opposite ends of the piston D equal to the weight of the piston and attached parts plus the downward pull on the piston exerted by the small piston extension J. When thereafter the discharge through the outlet passage A² is interrupted and the pressures prevailing at the opposite ends of the piston D become substantially equal the piston D moves back toward the position initially occupied by it under the action of gravity and the pull of the piston extension J. In order to minimize the evil consequence resulting from particles of sand or the like becoming lodged between the valve seats D² and the valve seat engaging portions E' of the valve member E, I provide the valves E with body portions as shown which substantially fill the lower end of the chambers D' when the parts are in the position shown in Fig. 1 so that leakage through the passages D' is small even though the valves E do not seat properly against the valve seats D². Because of the manner in which the cylindrical valve portions in themselves obstruct the flow through the passages D' there is a tendency for the water to be trapped below the piston D as the latter approaches the lower limit of its movement thus tending to prevent, or at least to delay a proper seating of the valve members E when the latter engage the cylinder head A³. To avoid undesirable sluggishness in this respect I provide additional means for equalizing the pressure at the opposite ends of the cylinder D when the flow between the inlet and outlet passages A' and A² is interrupted. This I accomplish by forming a port D⁴ of small diameter through the piston D and mounting in this port a rodlike valve member F which is formed with a longitudinal slot F' extending from a point close to its lower end upward to a point above the lowermost portion of the rod entering the passage D⁴. A spring F² connected to the rod F forms a frictional device tending to hold the rod in any position relative to the piston D in which it may be moved. The unslotted lower end of the rod F may be of a length such that it will just enter the piston D when the latter reaches its lowermost position or the unslotted portion may be even shorter since the maximum leakage which can take place along the rod F in any position of the latter relative to the piston is practically unobjectionable. The valve member F is positively moved, relative to the piston D, as the latter approaches either limit of its movement, and thus forms a simple and efficient cleaning device which serves to greatly minimize the possibility of the port D⁴ becoming clogged by foreign matter contained in the water. This cleaning action of the rod F forms the principal reason for its use in the port D⁴ in place of employing a somewhat more restricted port without any valve member in it. Nuts E⁵⁰ on the valve stems E³ provide stops positively limiting the upward movement of the piston D.

A⁵ represents a port uncovered by the piston D when the latter is in its uppermost position to then permit of a discharge of liquid therethrough to an auxiliary device not disclosed herein.

The particular auxiliary device, fully disclosed in my copending application, Serial No. 643,476, which I intend to supply with liquid through the port A⁵ is a fluid pressure motor actuating a reversing switch for periodically reversing the polarity of the electrodes of electrolytic purifying apparatus.

A piston rod G suitably connected at its lower end to the piston D passes upward through the cylinder head C and through a stuffing box C' secured thereto. To the base C² of the stuffing box are secured a pair of standards C³ which support a stationary crosshead C⁴ at their upper ends and form guides for a movable crosshead G', secured to the upper end of the piston rod G. The crosshead G' which is preferably formed of insulating material, supports an oil containing receptacle G² in which are located circuit controlling switch contacts H which are secured to the crosshead G. The contacts H move into and out of engagement with corresponding switch contacts I carried by the crosshead C⁴ accordingly as the piston D moves the crosshead G' toward and away from the crosshead C⁴. Since the engagement between each contact H and the corresponding contact I is made and broken beneath the surface of the oil in the receptacle G² there can be no injurious sparking with such voltages as are ordinarily employed in the use of the device.

The operation of the device will be apparent without further explanation to those skilled in the art, who will readily recognize the inherent simplicity and reliability of the device and the ease with which it may be taken apart and reassembled.

While in accordance with the provisions of the statutes I have illustrated and described the best form of my invention now known to me, it will be apparent to those skilled in the art that changes may be made in the form of the apparatus disclosed without departing from the spirit of my invention, and that certain features of the invention may sometimes be used with advantage without a corresponding use of other features.

Having now described my invention what I claim as new and desire to secure by Letters Patent, is:

1. A flow responsive circuit controlling device comprising in combination a cylinder having an inlet connection at one end and an outlet connection at the other end, a piston working in said cylinder and provisions tending to hold it at the inlet end of said cylinder when the pressures at the opposite ends of said cylinder are substantially alike, said piston being formed with a passage leading through it, a valve controlling said passage, provisions for closing said valve when the piston is adjacent the inlet end of the cylinder and for opening said valve on a predetermined movement of the piston toward the outlet end of the cylinder, and a switch mechanism actuated by said piston.

2. A flow responsive circuit controlling device comprising in combination a cylinder having an outlet connection at one end and at the other end an inlet connection and a cylindrical extension of reduced cross section, the latter being provided with a vent at its outer end, a main piston working in said cylinder, a loading piston working in said extension and connected to said main piston and tending to keep the latter at the inlet end of said cylinder when the pressure at the opposite ends of said cylinder are substantially alike, said loading piston being adapted to close said vent when the main piston is at the inlet end of said cylinder, said main piston being formed with a passage leading through it, means for closing said passage when said main piston is at the inlet end of the cylinder and means for opening said passage on a predetermined movement of the piston toward the outlet end of the cylinder, and a switch mechanism actuated by said piston.

3. A flow responsive circuit controlling device comprising in combination a cylinder having an outlet connection at one end and an inlet connection at the other end, a piston working in said cylinder and provisions tending to hold it at the inlet end of said cylinder when the pressures at the opposite ends of the cylinder are substantially alike, said piston being formed with a passage leading through it, a valve carried by said piston and engaging said cylinder and being shifted thereby to close said passage as said piston approaches the inlet end of the cylinder and to open said passage after a predetermined movement of the piston toward the outlet end of the cylinder, and a switch mechanism actuated by said piston.

4. A flow responsive circuit controlling device comprising in a combination a cylinder having an inlet connection at one end and an outlet connection at the other end, a piston working in said cylinder and provisions tending to hold it at the inlet end of said cylinder when the pressures at the opposite ends of the cylinder are substantially alike, said piston being formed with a passage leading through it, a valve carried by said piston, and engaging said cylinder and being shifted thereby to close said passage as said piston approaches the inlet end of the cylinder and to open said passage after a predetermined movement of the piston toward the outlet end of the cylinder, a switch mechanism actuated by said piston, and means tending to maintain said valve in any position relative to said piston into which it may be moved.

5. A flow responsive circuit controlling device comprising a cylinder having an inlet connection at one end and an outlet connection at the other end, a piston mounted in said cylinder and provisions tending to hold it at the inlet end of said cylinder when the pressures at the opposite ends of said cylinder are substantially alike, said piston being formed with a passage leading through it and with a valve seat surrounding the inlet end of said passage and a valve mounted in said piston and formed with a valve seat engaging portion and a short portion immediately adjacent thereto adapted to enter and substantially fill said passage, said valve engaging said cylinder and being shifted thereby to close said passage as said piston approaches the inlet end of the cylinder and to open said passage after a predetermined movement of the piston toward the outlet end of the cylinder, and a switch mechanism actuated by said piston.

6. A flow responsive circuit controlling device comprising in combination a cylinder having an inlet connection at one end and an outlet connection at the other end, a piston mounted in said cylinder and provisions tending to hold it at the inlet end of said cylinder when the pressures at the opposite ends of said cylinder are substantially alike, said piston being formed with a passage leading through it, means for closing said passage when the piston is adjacent the inlet end of the cylinder and means for opening said passage after a predetermined movement of the piston toward the outlet end of the cylinder, a switch mechanism actuated by said piston, said piston being formed also with an equalizing channel, and a member mounted therein to restrict the flow therethrough and engaging said cylinder and being moved thereby with respect to said piston as the latter moves back and forth in said cylinder whereby clogging of said channel is avoided.

7. A flow responsive circuit controlling device comprising a cylinder, having an inlet connection at one end and an outlet connection at the other end, a piston mounted in said cylinder and provisions tending to hold it at the inlet end of said cylinder when the pressures at the opposite ends of said cylinder are substantially alike, said piston being formed with a passage leading through it, means for closing said passage when the piston is adjacent the inlet end of the cylinder and means for opening said passage after a predetermined movement of the piston toward the outlet end of the cylinder, a switch mechanism actuated by said piston, said piston being formed also with an equalizing channel, and a member mounted therein to restrict the flow therethrough and engaging said cylinder and being moved thereby with respect to said piston as the latter moves back and forth in said cylinder whereby clogging of said channel is avoided, said member having a portion of enlarged cross section at its inlet end entering and filling said channel when said piston reaches the inlet end of the cylinder.

8. A flow responsive circuit controlling device comprising a cylinder having an inlet connection at one end and an outlet connection at the other end, a piston working in said cylinder and provisions tending to hold it at the inlet end thereof when the pressures at the opposite ends of the cylinder are equal, said piston having a passage formed in it connecting the opposite ends of said cylinder, and a valve seat surrounding said passage at its inlet end, a valve mounted in said passage and formed at its inlet end with a valve seat engaging portion and a projection engaging the inlet end of said cylinder when said piston approaches that end of the cylinder, and having a stem projecting at the opposite end of the piston and engaging the outlet end of the cylinder after a predetermined movement of the piston away from the inlet end of the cylinder.

9. A flow responsive circuit controlling device comprising in combination a cylinder having an inlet connection at one end and an outlet connection at the other end, a piston working in said cylinder and provisions tending to hold it at the inlet end thereof when the pressures at the opposite ends of the cylinder are equal, said piston having a passage formed in it connecting the opposite ends of said cylinder and a valve seat surrounding said passage at its inlet end, a valve mounted in said passage and formed at its inlet end with a valve seat engaging portion and a projection engaging the inlet end of said cylinder when said piston approaches that end of the cylinder, and having a stem projecting at the opposite end of the piston and engaging the outlet end of the cylinder after a predetermined movement of the piston away from the inlet end of the cylinder, and yielding frictional devices tending to hold said valves in any position relative to said piston into which they may be moved.

HARRY B. HARTMAN.

Witnesses:
 ARNOLD KATZ,
 D. STEWART.